United States Patent Office 2,788,045
Patented Apr. 9, 1957

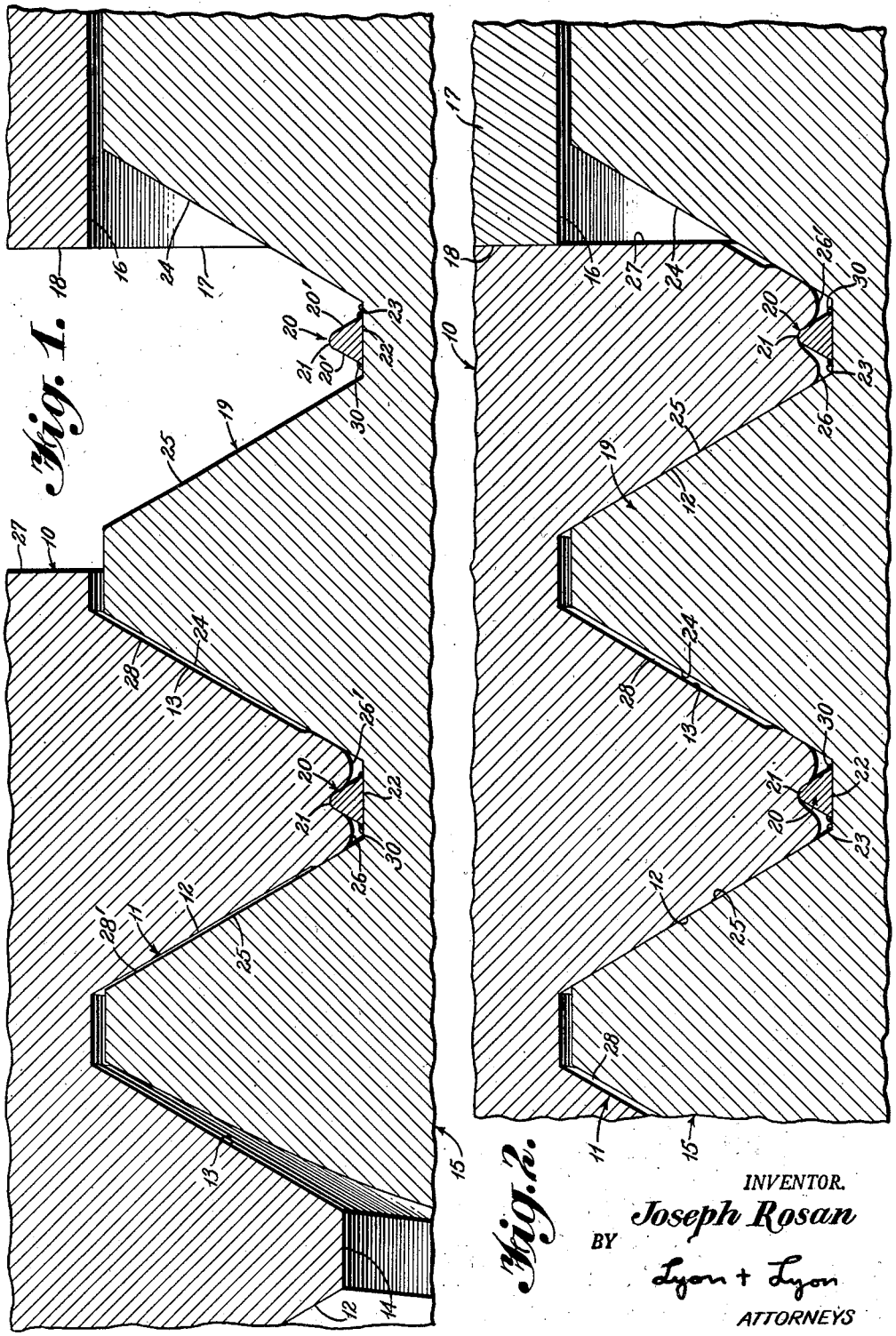

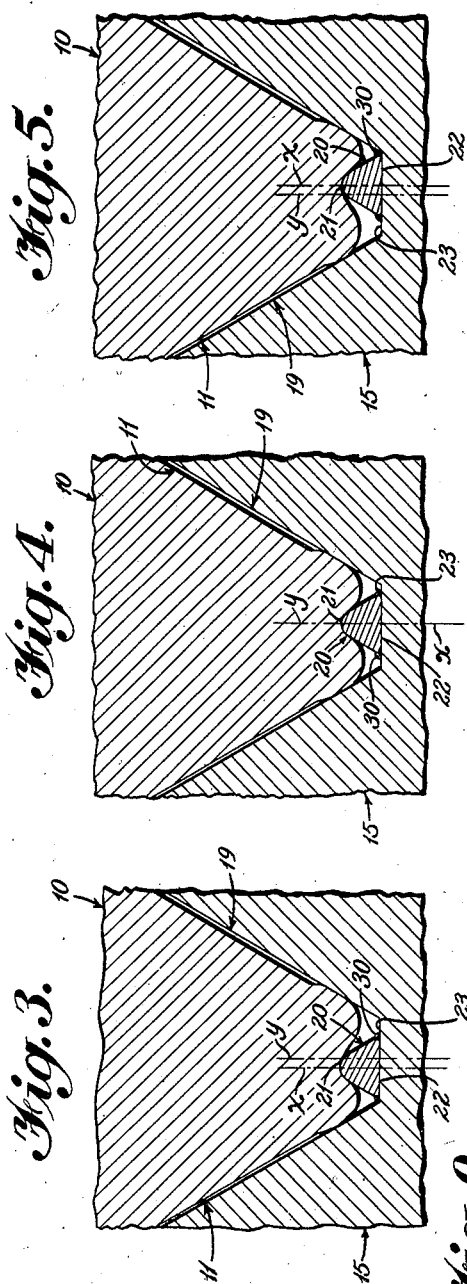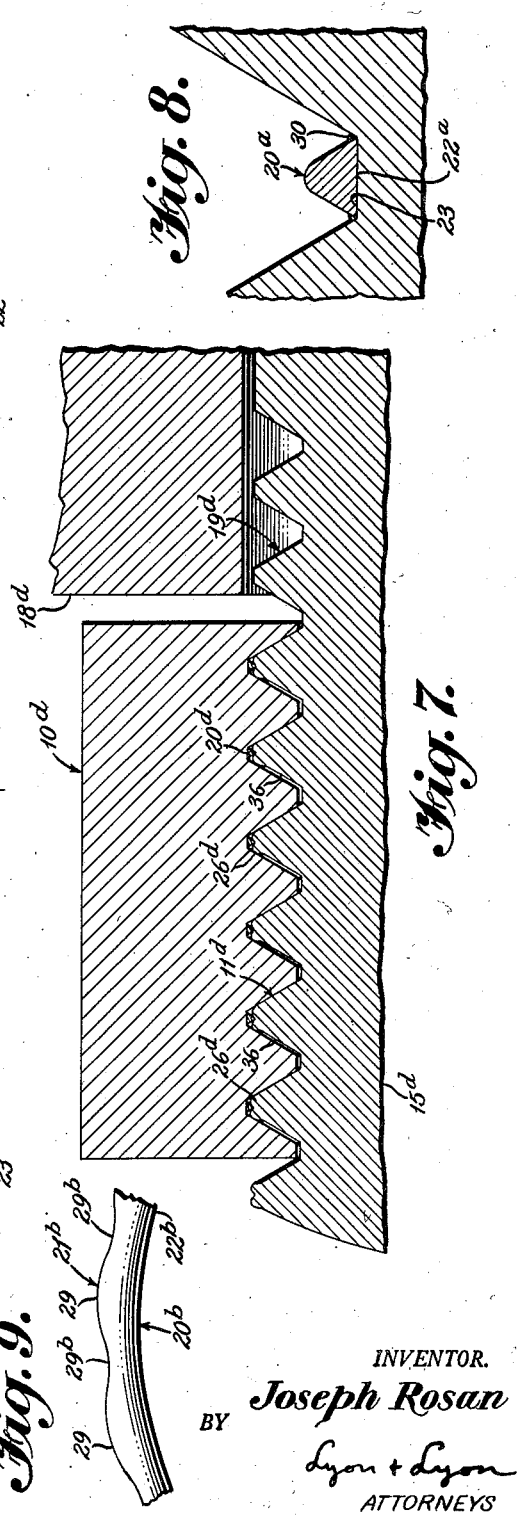

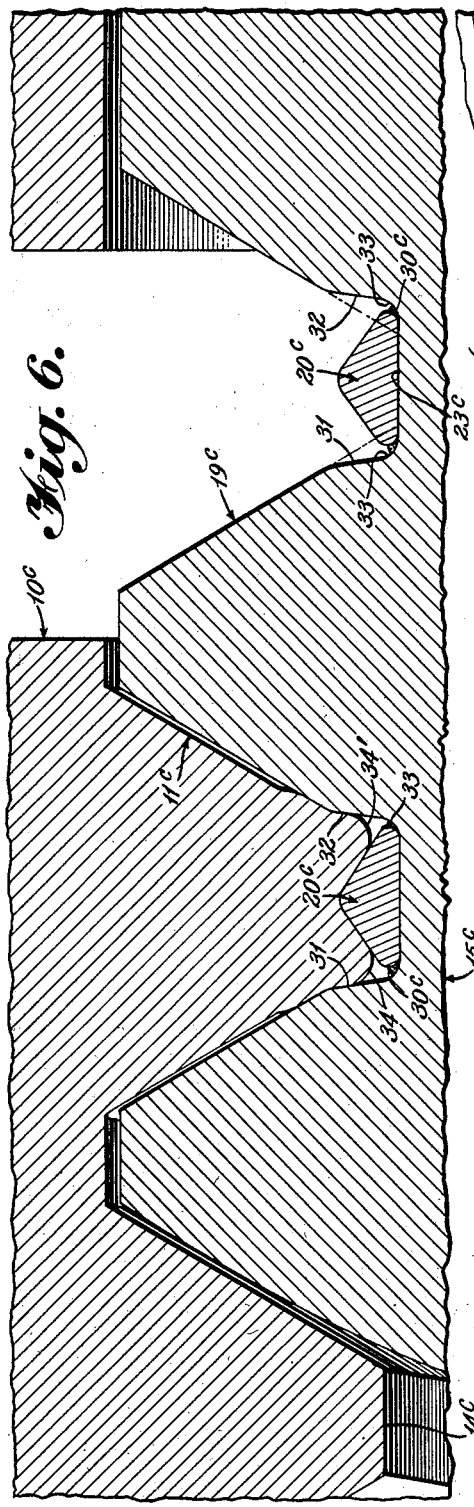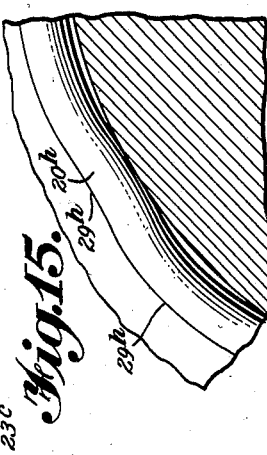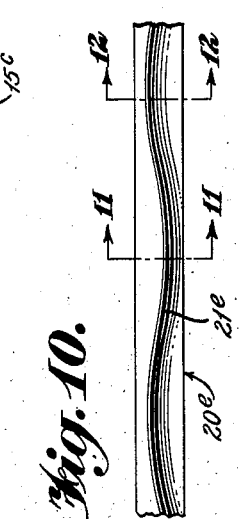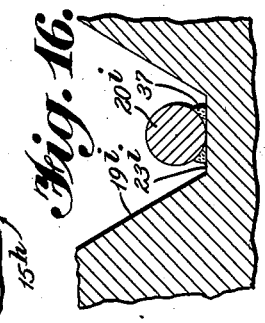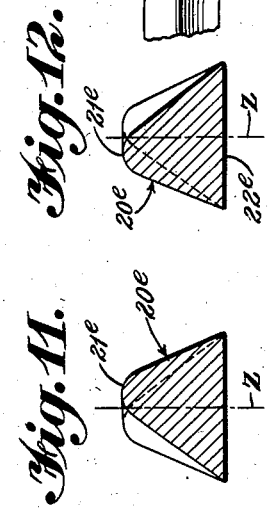

2,788,045

CONVENTIONAL TRUNCATED SCREW THREADS WITH SMALL LOCKING THREAD BONDED THEREBETWEEN

Joseph Rosán, Newport Beach, Calif.

Application October 6, 1952, Serial No. 313,280

12 Claims. (Cl. 151—22)

My invention relates to screw threads and is particularly directed to improvements in mating thread constructions to provide a controlled degree of interference when assembled, in order to resist separation of the mating parts.

This application is related to my copending application Serial No. 309,960, filed September 17, 1952, wherein an integral locking thread is formed at the root of a primary thread, as distinguished from a separately formed locking thread similarly located which characterizes the present invention.

Screw thread devices having interfering parts at the crests or roots of the threads have been proposed heretofore but have not met with widespread acceptance. For example, the locking thread device shown in the Meersteiner Patent No. 2,109,778 shows a separate helical cutting element interposed between mating threads and positioned at the roots of the threads on the bolt. The cross section of the helical element is that of a parallelogram with diagonally opposed sharp corners positioned to become imbedded in the metal of the screw and nut when the two are threaded together. This separate helical wire element must be harder than the metal of either the bolt or the nut in order to produce the required cutting, imbedding, and locking action. The sharp corners which are relied upon to restrain relative motion of the helical element on the bolt during installation of the nut produce highly objectionable localized stresses at the roots of the thread of the bolt. This is particularly undesirable in fastenings subject to fatigue action under stress reversals or rapid changes in magnitude of stress. The stress-raiser effect of the sharp corner digging into the metal of the bolt at the roots of the thread leads to fatigue failure and in consequence seriously reduces the permissible working stress to be carried on the bolt.

It is the principal object of the present invention to produce a separate locking thread arrangement and to overcome the stress-raiser limitation in the prior art construction as discussed above. More particularly, it is an object of my invention to provide a novel form of locking thread which produces interference at the root of one of a pair of mating threads without setting up high stresses which produce galling on the flanks of the threads, and without contributing to early failure by fatigue action.

Another object is to provide a screw thread construction in which the interfering parts are provided by a secondary helical thread element fixed on or anchored to one of the members throughout its length and positioned between the primary threads at the roots thereof. In effect, I provide a thread within a thread, the primary large thread having flanks carrying the axial load and the secondary small helical thread element effecting interfering locking engagement with the crests of the threads on the mating member. This interfering engagement causes lateral flow and distortion of the mating thread crests without producing excessively high stresses, because the locking thread element applies cleavage force to each crest of the mating threads.

Another object is to provide a locking thread construction which avoids objectionable stress concentration inherent in the Meersteiner design. This object is achieved by avoiding the sharp corners employed by Meersteiner, as by providing a broad bearing area on the base or inner surface of the locking element which is complemental to the surface at the root of the primary thread. Furthermore, the crests of the locking thread elements are much narrower than the base and also rounded rather than pointed in order to apply cleavage force to the crests of the primary threads on the other member without setting up stress concentrations which could lead to propagation of cracks.

Another object is to provide a locking thread construction in which the extent of interference can be readily controlled to produce the magnitude and degree of locking effect desired.

Another object is to provide a locking thread construction in which the separate locking element is generally helical in form but which has a varying nonconstant pitch with respect to the primary threads. The generally helical element is therefore shifted in its position relative to the primary threads in an undulating fashion throughout its length. The undulation may be axial or in a radial direction, or both axial and radial. The purpose of this construction is to enhance the locking effect achieved by interference with the crests of the threads engaged by the locking element.

While my invention in its broader aspects may be employed with any one of a large number of thread forms, I have chosen to describe it in connection with American National threads of well-known conventional form. Threads under the American National designation are V shaped with 60° included angle between the flanks of adjacent threads, and in class 3 threads in this system the dimensional tolerances are such that the flanks of the mating threads may have clearance, but not interference. The crests and roots of the male and female threads are truncated. The secondary locking thread of my invention engages the crests of these conventional truncated surfaces in interfering relationship. While my secondary locking element may be located at the root of the male thread or the root of the female thread as desired, I prefer to locate the secondary locking thread at the root of the male thread wherever the strength of the metal of the male thread exceeds that of the female thread. In a typical installation the male member and locking element may be formed of steel or any other hard metal while the female or socket member may be formed of a softer metal such as cast iron or non-ferrous material, for example, aluminum alloy or plastic. If the male and female members are formed of the same material the secondary locking element may be placed on either member, but, in any event, must be hard enough to displace the material of the crest engaged therewith. The member carrying the locking element may have a standard or modified standard thread and the other member preferably has a standard thread of corresponding size.

With these and other objects in view, as will appear hereinafter, reference is directed to the accompanying drawings, in which:

Fig. 1 is a diagrammatic sectional view of a preferred embodiment of the invention showing a fragment of a nut assembled on a fragment of a bolt with the nut spaced from a fixed shoulder;

Fig. 2 is a sectional view similar to Fig. 1 but showing the nut engaged with the shoulder;

Figs. 3, 4, and 5 are diagrammatic transverse sectional views illustrating the manner in which the position of the separate wire locking element may be varied relative to the root of the primary thread at different locations along its length to produce an undulation in the locking thread departing from a true helix. Specifically, Fig. 3 shows the locking element shifted to the left with respect to the center of the root of the primary thread, Fig. 4 shows the locking element in a true central position, and Fig. 5 shows it shifted to the right of the central position;

Fig. 6 illustrates another form of the invention particularly applicable to fine threads and wherein the primary thread is modified at its root to provide the space necessary to receive a wire locking element;

Fig. 7 is a diagrammatic sectional view similar to Fig. 1, but showing the locking element mounted upon the nut or the female member;

Fig. 8 is a fragmentary sectional view illustrating a wire locking element having a base substantially equal to the width of the groove at the root of a thread;

Fig. 9 is a fragmentary side elevational view of a modified form of the wire locking element shown in Fig. 1, for example, having the crest thereof radially undulated;

Fig. 10 is a fragmentary plan view of another form of wire locking element wherein only the crest of the element is axially undulated;

Figs. 11 and 12 are vertical sectional views taken along the lines 11—11 and 12—12, respectively, of Fig. 10, but exaggerated to illustrate the axial undulation of the crest of the wire locking element;

Fig. 13 is a diagrammatic view, partly in section, illustrating another form of wire locking element having only its crest radially and axially undulated;

Fig. 14 is a fragmentary side elevational view of another form of wire locking element which is bodily distorted or undulated radially;

Fig. 15 is a fragmentary plan view of another form of wire locking element which is bodily distorted or undulated axially; and Fig. 16 is a fragmentary sectional view illustrating a wire locking thread that is circular in transverse cross-section.

Referring to the drawings:

The nut 10 may be provided with any suitable or desirable internal thread 11 and as shown in the drawings this internal thread may comprise an American National, class 3 thread of conventional form. The thread may be formed by any suitable or convenient means. The flanks 12 and 13 of the internal thread 11 have a 60° included angle and the crest is truncated to form a cylindrical surface 14. The nut 10 and the internal thread 11 as thus described may be of conventional form.

A bolt 15 extends through an opening 16 in a stationary member 17 provided with a shoulder 18. An external thread generally designated 19 is provided on the bolt 15. Except for the region adjacent the roots of the external thread 19, this thread is conventional and is proportioned to mate with the internal thread 11 in the nut 10. The thread 19 is hereafter referred to as the primary thread.

In accordance with my invention I provide a secondary or locking thread generally designated 20 which is positioned between the convolutions of the larger thread 19 and adjacent the roots thereof. This secondary or locking thread comprises a separate element preferably preformed into a generally helical state. The wire 20 is substantially triangular, and symmetrical, in cross section and is rounded at its crests 21. The base surface is preferably plain, or flat, as shown at 22, for complemental surface engagement with the base of the thread groove 23 between the flanks 24 and 25 of adjacent primary threads. The sides 20' of the locking element are also flat and may have any suitable included angle therebetween that will provide a large bearing area at the base 22 to resist penetration of the element 20 into the bolt 15 at the surface 23. The depth of the primary screw thread 19 may be from three to seven times the radial thickness of the locking element 20 with good results. The helical locking element 20 is threaded onto the bolt 15 and may be secured at its ends and/or at points intermediate its ends to the bolt 15 by any convenient means, such as by spot or tack welding, not shown, or it may be continuously secured to the bolt throughout its length, for example, by brazing.

Fig. 1 shows how the truncated crests of the internal thread 11 are distorted when the nut and bolt are initially assembled. The crest surface designated 14 illustrates the conventional form of the thread crest before distortion occurs. When the threads 11 and 19 are screwed together the secondary or locking thread 20 presses into the crest 14 and deforms it laterally in both directions and also radially inwardly as shown by the enlargements at 26 and a 26', while grooving and dividing it centrally. The deformed portions are spread laterally to increase the width of the crest and inwardly to increase the height of the thread and form an interference fit with the adjacent flanks 24 and 25 of the primary thread 19. This crest dividing and distorting action is substantially symmetrical about the secondary thread 20. The flanks 12 and 25 normally ride in engagement while the nut 10 is being threaded on the bolt 15, although a very slight clearance 28' has been shown in Fig. 1 in contrast with a relatively greater clearance 28 between the flanks 13 and 24. The clearances are exaggerated in the drawings for purposes of illustration.

When the nut 10 is tightened against the shoulder 18, as shown in Fig. 2, the flanks 25 on the primary thread 19 meet in substantially full surface engagement with the flanks 12 on the internal thread 11, thereby eliminating any clearance 28' that may have been present. The clearance 28 between the flanks 24 and the flanks 13 will then increase slightly. The flanks 12 and 25 are therefore placed in interfering engagement adjacent the roots of the thread 19 and the crest of the thread 11. It will be understood from this description that the axial load transmitted between the bolt 15 and the nut 10 is carried on the flanks of the primary threads 11 and 19 while the locking action is developed by the interfering engagement between the locking thread 20 and the crests of the internal thread 11, supplemented by the interfering engagement of the flanks 12 having the enlargements 26 with the flanks 25, and the interfering engagement of the enlargements 26' with the flanks 24 adjacent the root 23. Thus, as the threads are tightened, the enlargements 26 and 26' tend to deform toward the right, as viewed in Fig. 2. The degree of interference can be readily controlled in various ways, for example, by controlling the internal diameter of the crest 14. This diameter may obviously be changed by varying the size of the drill used prior to tapping of the threads 11 in the nut 10. Varying the tap drill size is thus one effective means of varying the degree of interference required. Other means for varying the interference will be described hereinafter.

Figs. 1 and 2 illustrate the type of distortion which occurs between the locking thread 20 and the crests of the thread 11 on the other member when such other member is formed of softer material than the bolt member and locking thread. Thus, Figs. 1 and 2 show the type of distortion which occurs when an all-steel bolt embodying my invention is threaded into a female thread provided on an aluminum alloy part. Most of the distortion occurs in the aluminum alloy part and the distortion will vary in accordance with the character of materials employed. The interfering engagement is particularly effective to prevent unscrewing movement of the parts under varying loads or vibration with or without accompanying temperature changes, and furthermore the parts may be assembled and disassembled a great many times without losing the locking effect.

The crown of the thread 14 is truncated and cylindrical and the surface of the groove 23 at the root of the thread 19 is normally correspondingly cylindrical in shape. In order to avoid penetration of the wire element into the root surface and thereby prevent the formation of cracks due to cleavage, the wire element is preferably provided with the plain, substantially flat, inner surface 22 which seats upon the cylindrical surface at the root of the thread. Also, the width of the base surface of the wire element is made as wide as practicable in order to provide a wide bearing area for resisting penetration of the base of the wire element into the bolt 15. The height as well as the width of the locking element 20 may be varied to produce the degree of interference desired. Figs. 1 and 2 show a locking element of less width than the base of the groove 23, whereas Fig. 8 shows a locking element $20^a$ having a base $22^a$ approximately as wide as the bottom of the groove 23. One inherent advantage of the latter locking element is that its convolutions tends to assume a pitch equal to that of the primary thread, whereas when a narrow wire is used in a wide groove, its convolutions may not conform exactly with the pitch of the convolutions of the primary thread, but this is not necessarily disadvantageous, and in fact, affords certain advantages which will be pointed out hereinafter.

As a specific example, a ⅜" diameter standard nut and bolt has 16 threads to the inch, and a clearance of about .00075 of an inch between the confronting flanks of the mating threads, or a total clearance of .0015 of an inch for each thread. In order to provide a positive lock, the crown of the thread 11 is distorted or expanded to an amount equal to about twice the total normal clearance, or about .003 of an inch. This provides a total excess of .0015 of an inch of metal on the deformed crown of the thread 11 to bind or be displaced back toward normal in effecting the lock. The same principle of distorting the thread to twice the total normal clearance applies also to the root clearance, in instances where locking engagement between the periphery of the crown of the thread 11 and the root of the mating thread is desired. The locking element 20 may be of any suitable height, as previously pointed out, and a height of .007 of an inch is satisfactory for the particular thread described.

The locking thread 20 may be preformed as a helix with a uniform pitch equalling the pitch of the primary thread 19. In such case, each convolution of the helical wire element 20 lies substantially midway between the flanks 24 and 25 of the thread 19. The helical wire element 20 may be anchored to the bolt 15 at the opposed ends of the wire element, and at points between said ends if desired, by any preferred means, such as spot or tack welding, not shown. Alternatively, the helical wire element 20 may be continuously brazed along its base to the bolt 15, as indicated at 30. The brazing may be accomplished in any suitable or desirable fashion. For example, the wire element 20, in pre-coiled form, may be coated with brazing material such as copper and then threaded into the helical groove 23 and subsequently furnace-brazed. The wire element 20 is designed to tightly engage with the base of the groove 23 so that clamping of the wire in the groove is unnecessary during the brazing operation. Instead of pre-coiling the wire element, a coated wire may be wound or wrapped into the helical groove 23 and subsequently furnace-brazed. If desired, the wire can be first spot welded in place and later brazed. In either case, if necessary, the pitch of the helical wire 20 can be trued up or made uniform, after the wire has been secured in its groove 23, by the use of a thread-rolling tool (not shown) having a groove to receive the wire element 20 and set it so that its crest is disposed centrally between the flanks 24 and 25 of the primary thread 19. It is often preferable, however, to omit rolling the helical wire element 20 at this stage in order to retain and take advantage of any irregularity, waviness or undulation with respect to the helical groove 23 which arises through the minor variations in seating of the wire in the groove, or other irregularity which may develop during the wire securing or brazing operation. As shown in Figs. 3, 4, and 5, the position of the center line X of the wire element 20 may vary along the helical length of the element with respect to the center line Y of the root of the primary thread 19. More specifically, in Fig. 3 the center line X is shown to the left of the center line Y. In Fig. 4 the two center lines X and Y coincide. In Fig. 5 the center line X is shown to the right of the center line Y. This waviness, undulation or irregularity in the pitch of the wire element 20 is exaggerated in the drawings for purposes of illustration. At least a part of this variation is absorbed by elastic deformation of the material and the result is that the torque required to unscrew the threaded connection is considerably increased and the locking effect is thereby enhanced.

Fig. 6 illustrates a modified form of the invention which is particularly adaptable to fine threads where little clearance exists at the root of the thread to receive a wire locking element and the deformed crown of a mating thread. By way of illustration, a bolt $15^c$ has its standard thread $19^c$ modified by widening of the flanks in the region at the root of the thread $23^c$, as indicated at 31 and 32. The portions 31 and 32 are merged into the base of the groove $23^c$ by fillets 33. A locking element $20^c$ is brazed to the bottom of the groove $23^c$, at $30^c$ in the manner previously described in connection with the locking element 20. The added clearance space thus provided in the region of the fillets 33 at the root of the primary thread $19^c$ is for the purpose of accommodating the locking element $20^c$, which otherwise could not be mounted on a standard fine thread because of a lack of space at the root of such thread. Enlargements 34 and 34' are formed on the crest $14^c$ of the mating nut member $10^c$ when the bolt $15^c$ and nut $10^c$ are threaded together. The thread $19^c$ locks with the thread $11^c$ in the same general manner as the threads 19 and 11 previously described.

In the alternative form of the invention shown in Fig. 7, the wire locking thread $20^d$ is provided at the root of the conventional female thread $11^d$ on the nut $10^d$ while the bolt $15^d$ is initially formed with a corresponding conventional male thread $19^d$. When the nut $10^d$ is screwed on the bolt $15^d$, the locking thread $20^d$ develops an interfering engagement with the crests of the male thread $19^d$ and laterally and radially enlarges the same at $26^d$, in the same manner described in connection with the locking element 20 and the crests 11. When the nut $10^d$ is screwed against the shoulder $18^d$, axial distortion of the threads $11^d$ occurs to eliminate any clearance present on the compression side of the threads and to possibly increase the clearance 36 on the other side. The locking thread $20^d$ may be embodied in the nut $10^d$ when the strength of the material of the nut is substantially the same as that of the bolt. In such case, the locking thread $20^d$ may be employed on either member, as desired.

Means other than that already described may be employed to deliberately accentuate variation and pitch of the helical wire locking element with respect to the pitch of the primary thread, as by forming undulations or waves in the wire either before or after it is secured in its groove. Thus, in Fig. 9 a wire locking element $20^b$ is shown which has a plain, flat base $22^b$ and a rounded crest $21^b$ that is undulated and characterized by hills and valleys 29 and $29^b$ which may be formed by any suitable rolling tool (not shown). The locking element $20^b$ is of triangular cross-section, similar to the locking element 20 and may be associated with a primary thread in lieu of any of the locking elements 20, $20^a$, $20^c$ or $20^d$.

Figs. 10, 11 and 12 illustrate another form of wire locking element 20e, which is similar to the element 20 but is characterized by having only the rounded crest 21e thereof undulated axially. Figs. 11 and 12 illustrate in exaggerated form the axial displacement of the crest 21e relative to a center line Z passing vertically through the center of the base 22e. Hence, even though the locking element 20e is partially distorted axially, it retains a generally triangular cross-section.

Fig. 13 illustrates another form of the invention wherein a wire locking element 20f, similar to the element 20e, has its crest 21f further undulated radially, as indicated at 21', in a manner similar to the undulated crest of the wire element 20b shown in Fig. 9. The compound undulation increases the effectiveness of the locking element and adapts it for use on threaded elements subject to very severe vibration.

Fig. 14 illustrates another form of wire locking element 20g similar to the locking element 20, except that it is bodily distorted in an axial direction to provide axial undulations 29g therein presenting a general serpentine appearance.

Fig. 15 illustrates a threaded member 15h having another wire locking element 20h which is similar to the locking element 20, but differs therefrom in that it is radially undulated at 29h. The locking element 20h may also be axially undulated similar to the locking element 20g in order to provide it with both axial and radial undulations to combine the locking advantages of both in a single wire locking element.

Fig. 16 illustrates a wire locking element 20i which is circular in transverse cross-section and which is preferably of smaller diameter than the width of the base of the groove 23i at the root of the thread 19i. The wire locking element 20i is preferably brazed to the bottom of the groove 23i as indicated at 37. It is to be understood that the element 20i may be undulated radially similar to the element 20g, or undulated axially, similar to the element 20h, or undulated both radially and axially in the same manner as the various forms of wire locking elements described hereinabove.

It will also be understood that the terms "bolt" and "nut" are used herein in a descriptive sense only and that the "nut" may constitute any member having an internal thread while the "bolt" may constitute any member having a mating external thread.

While the particular form of thread chosen to illustrate the invention has opposed flanks of equal angles, it will be understood that other forms of threads having opposing flanks of unequal angles such as, for example, buttress threads, may be used with a secondary locking thread with equally good results.

Having fully described my invention, it is to be understood that I do not wish to be limited to the details herein set forth, but my invention is of the full scope of the appended claims.

I claim:

1. A threaded metallic member having a conventional helical primary screw thread for carrying axial loads, said primary screw thread having flanks with an included angle of substantially 60°, a truncated crown, and a root surface of substantial area between its convolutions; a separate, relatively small, helical wire locking thread located at the root of and interposed between the convolutions of said primary screw thread, said wire locking thread having an inner surface confronting a substantial area of said root surface and said root surface providing a broad bearing area for said inner surface of said wire locking thread sufficient to avoid penetration of said wire locking thread into said member; and means bonding said wire locking thread to said member to secure said wire locking thread against circumferential movement with respect to said root surface, said wire locking thread having a rounded convex crest; and said member having a space located at the root surface and between the primary thread and the wire locking thread on either side of said crest of said wire locking thread, the radial height of said wire locking thread being substantially greater than the normal root clearance for the size of its associated primary thread, whereby when said member is threadedly engaged with a mating conventional truncated thread on another member, the crest of the wire locking thread will press into the truncated crown of said mating thread to distort and spread it laterally to form an interference fit therewith and the cross-sectional area of the portion of said wire locking thread which is pressed into the crown of said mating thread being no greater than the combined cross-sectional area of the normal minimum clearance between the distortable crown portion of said mating thread and the root portions of said primary screw thread confronting said mating thread on either side of said wire locking thread, whereby said spaces then afford room to receive said distorted portions of said crown of said mating thread.

2. A threaded member as defined in claim 1, in which the wire locking thread is bonded to said threaded member throughout the length of said locking thread.

3. A threaded member as defined in claim 1, in which the primary screw thread has a radial height of 3½ to 7 times that of the wire locking thread.

4. A threaded member as defined in claim 1, in which at least the crest of the wire locking thread is undulated axially.

5. A threaded member as defined in claim 1, in which at least the crest of the wire locking thread is undulated radially.

6. A threaded member as defined in claim 1, in which at least the crest of the wire locking thread is undulated axially and radially.

7. A threaded member as defined in claim 1, in which the primary thread has rounded fillets at the juncture between the root surface and the flanks of said primary screw thread.

8. A threaded member as defined in claim 7, in which the flanks of the primary screw thread include portions adjacent the root surface disposed substantially perpendicular to the axis of said primary screw thread.

9. A threaded member as defined in claim 1, in which the wire locking thread is of generally triangular shape in cross-section and its inner surface forms a flat base portion of the triangle and the root surface is complemental to said base portion.

10. A threaded member as defined in claim 9, in which the base of the wire locking thread is of approximately the same width as the axial width of the root surface.

11. A threaded member as defined in claim 1 in which the locking thread is substantially circular in cross-section.

12. A threaded metallic member having a conventional helical primary screw thread for carrying axial loads, said primary screw thread having flanks with an included angle of substantially 60°, a truncated crown, and a plain cylindrical root surface of uniform diameter between its convolutions; a separate, relatively small, helical wire locking thread located at the root of and interposed between the convolutions of said primary screw thread, said wire locking thread having an inner surface confronting a substantial area of said cylindrical root surface and said cylindrical root surface providing a broad bearing area for said inner surface of said wire locking thread sufficient to avoid penetration of said wire locking thread into said member; and means bonding said wire locking thread to said member to secure said wire locking thread against circumferential movement with respect to said cylindrical root surface, said wire locking thread having a rounded convex crest, and said member having a space located at the cylindrical root surface and between the primary thread and the wire locking thread on either side of said crest of said wire locking thread, the radial height of said wire locking thread being substantially greater than the normal root clearance for the size of its associated primary thread, whereby when said member is threadedly engaged with a mating conventional truncated thread on another member, the crest of the wire locking thread will press into the truncated crown of said mating thread to distort and spread it laterally to form an interference fit therewith and the cross-sectional area of the portion of said wire locking thread which is pressed into the crown of said mating thread being no greater than the combined cross-sectional area of the normal minimum clearance between the distortable crown portion of said mating thread and the root portions of said primary screw thread confronting said mating thread on either side of said wire locking thread, whereby said spaces then afford room to receive said distorted portions of said crown of said mating thread.

References Cited in the file of this patent

UNITED STATES PATENTS

| | | |
|---|---|---|
| 720,580 | Greenfield | Feb. 17, 1903 |
| 1,300,801 | Woodward | Apr. 15, 1919 |
| 1,957,095 | Cole | May 1, 1934 |
| 2,109,778 | Meersteiner | Mar. 1, 1938 |
| 2,177,003 | Purtell | Oct. 24, 1939 |
| 2,177,100 | Frame | Oct. 24, 1939 |
| 2,367,213 | Harding | Jan. 16, 1945 |

FOREIGN PATENTS

| | | |
|---|---|---|
| 317,106 | Germany | Dec. 9 1919 |